US010017217B2

(12) United States Patent
Villarreal, Sr. et al.

(10) Patent No.: US 10,017,217 B2
(45) Date of Patent: Jul. 10, 2018

(54) CONTINUOUS TRACK COVERING DEVICE

(71) Applicants: Ricardo Villarreal, Sr., Crowley, TX (US); Ricardo Villarreal, Jr., Crowley, TX (US)

(72) Inventors: Ricardo Villarreal, Sr., Crowley, TX (US); Ricardo Villarreal, Jr., Crowley, TX (US)

(*) Notice: Subject to any disclaimer, the term of this patent is extended or adjusted under 35 U.S.C. 154(b) by 193 days.

(21) Appl. No.: 14/993,180

(22) Filed: Jan. 12, 2016

(65) Prior Publication Data
US 2016/0236731 A1 Aug. 18, 2016

Related U.S. Application Data

(60) Provisional application No. 62/116,640, filed on Feb. 16, 2015.

(51) Int. Cl.
B62D 55/088 (2006.01)
B62D 25/08 (2006.01)

(52) U.S. Cl.
CPC ......... B62D 55/088 (2013.01); B62D 25/088 (2013.01)

(58) Field of Classification Search
CPC .. B60J 11/00; B60J 11/06; B60J 11/02; B60R 1/06; B64F 1/005
USPC .............. 150/154, 166, 167; 206/304.1; 296/100.01; 305/100, 107, 136
See application file for complete search history.

(56) References Cited

U.S. PATENT DOCUMENTS

| 3,710,646 | A | * | 1/1973 | Bogan | F16H 57/028 |
| | | | | | 105/140 |
| 3,770,035 | A | * | 11/1973 | Haye, Sr. | B62D 25/168 |
| | | | | | 206/304.1 |
| 3,885,471 | A | * | 5/1975 | Morine | F16P 1/02 |
| | | | | | 474/144 |
| 3,927,578 | A | * | 12/1975 | Mattila | F16P 1/02 |
| | | | | | 474/146 |
| 4,068,905 | A | * | 1/1978 | Black | B62D 55/275 |
| | | | | | 305/51 |
| 5,018,564 | A | * | 5/1991 | Anglin | B62J 13/04 |
| | | | | | 150/167 |
| 5,809,606 | A | * | 9/1998 | MacDonald | A63C 17/0006 |
| | | | | | 15/160 |

(Continued)

FOREIGN PATENT DOCUMENTS

GB 2255942 A * 11/1992 ............. B60J 11/00

Primary Examiner — Fenn C Mathew
Assistant Examiner — Cynthia Collado
(74) Attorney, Agent, or Firm — Global Intellectual Property Agency, LLC; Jordan Sworen

(57) ABSTRACT

A continuous track covering device for a continuous track vehicle that prevents dirt and debris from falling therefrom when the vehicle is being transported. The continuous track covering device includes a cover having a first panel, a second panel, and a third panel linearly aligned with one another. The cover can be wrapped around the exposed portions of a continuous track of a continuous track vehicle when the vehicle is being transported. The device further includes one or more loop fasteners that can receive a strap therethrough and one or more pockets that can receive a magnet therein, wherein the straps and magnets are used to removably secure the cover to the continuous track. Additionally, one or more side hooks are included on the cover to further secure the cover to the continuous track.

8 Claims, 4 Drawing Sheets

(56) References Cited

U.S. PATENT DOCUMENTS

| | | | |
|---|---|---|---|
| 5,957,796 A * | 9/1999 | McLean | F04B 23/00 |
| | | | 417/313 |
| 6,129,408 A | 10/2000 | Schultz et al. | |
| 7,080,846 B2 | 7/2006 | Morgans | |
| D540,256 S * | 4/2007 | Bullock, Jr. | D13/118 |
| 7,213,893 B1 * | 5/2007 | McCraw | B60J 11/00 |
| | | | 280/847 |
| 7,478,723 B2 | 1/2009 | Spater et al. | |
| 8,790,200 B2 * | 7/2014 | Boissonneault | F16P 1/02 |
| | | | 474/146 |

* cited by examiner

CONTINUOUS TRACK COVERING DEVICE

CROSS REFERENCE TO RELATED APPLICATION

This application claims the benefit of U.S. Provisional Application No. 62/116,640 filed on Feb. 16, 2014. The above identified patent application is herein incorporated by reference in its entirety to provide continuity of disclosure.

BACKGROUND OF THE INVENTION

Field of the Invention

The present invention relates to protective covering devices. More specifically, the present invention provides a continuous track covering device comprising a first panel, a second panel, and a third panel, linearly aligned to one another and adapted to cover a continuous track of a continuous track vehicle so as to prevent debris and dirt from leaving therefrom during transport.

When operating continuous track vehicles, dirt, rocks, and other debris become lodged between the members of the track. As a result, when the vehicle is transported on a truck or trailer, the debris lodged in the track loosens and falls therefrom onto the roadway or strikes another vehicle on the road. Debris dispersed onto the roadway creates a safety hazard, potentially leading to cracked windshields, car accidents, or other damage to vehicles. Therefore, there exists a need in the prior art for a device that prevents dirt and debris from falling from the track of a continuous track vehicle.

Devices have been disclosed in the prior art that relate to covering devices. These include devices that have been patented and published in patent application publications. These devices generally relate to coverings for wheels, tracks, and other equipment, such as U.S. Pat. No. 7,213,893, U.S. Pat. No. 6,129,408, U.S. Pat. No. 3,927,578, U.S. Pat. No. 7,478,723, and U.S. Pat. No. 7,080,846.

These prior art devices have several known drawbacks. The devices in the prior art comprise a cover, however, the devices in the prior art fail to provide a multi-panel covering for a continuous track that can be conveniently wrapped around the exposed portions of the track of a vehicle when the vehicle is being transported. Further, the prior art fails to provide a variety of fasteners and straps that enable the cover to be securely positioned onto the track.

In light of the devices disclosed in the prior art, it is submitted that the present invention substantially diverges in design elements from the prior art and consequently it is clear that there is a need in the art for an improvement to existing covering devices. In this regard the instant invention substantially fulfills these needs.

SUMMARY OF THE INVENTION

In view of the foregoing disadvantages inherent in the known types of continuous track covering devices now present in the prior art, the present invention provides a new continuous track covering device wherein the same can be utilized for preventing dirt and debris from falling from the tracks of a continuous track vehicle when the continuous track vehicle is being transported on a truck or other vehicle.

It is therefore an object of the present invention to provide a new and improved continuous track covering device that has all of the advantages of the prior art and none of the disadvantages.

It is another object of the present invention to provide a continuous track covering device comprising a cover having a first panel, a second panel, and a third panel, wherein the second panel is pivotally connected to the first and third panels.

Another object of the present invention is to provide a continuous track covering device wherein the panels are adapted to wrap around a continuous track of a continuous track vehicle so as to prevent dirt and debris leaving therefrom when the continuous track vehicle is being transported by a truck or other vehicle.

Yet another object of the present invention is to provide a continuous track covering device comprising one or more pockets adapted to receive a magnet therein for securing the second panel to a side of the continuous track.

Yet another object of the present invention is to provide a continuous track covering device comprising one or more loop fasteners disposed on the periphery of the cover, wherein the fasteners are adapted to receive a strap therein in order to secure the cover to the track.

Another object of the present invention is to provide a continuous track covering device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
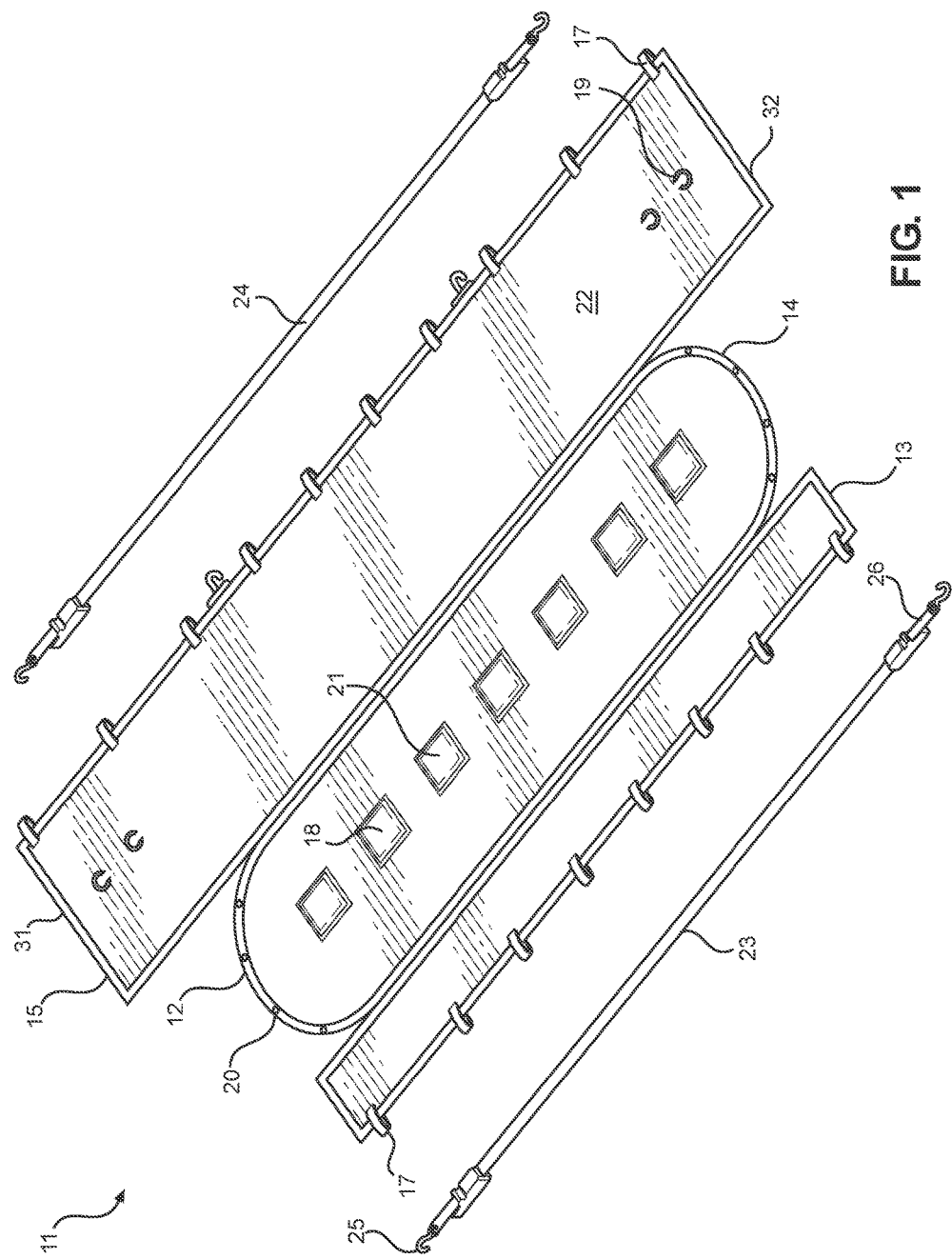
FIG. 1 shows a perspective view of the continuous track covering device.

Reference is made herein to the attached drawings. Like reference numerals are used throughout the drawings to depict like or similar elements of the continuous track covering device. For the purposes of presenting a brief and clear description of the present invention, the preferred embodiment will be discussed as used for covering a continuous track of a continuous track vehicle when the continuous track vehicle is being transported on a truck or other vehicle. The figures are intended for representative purposes only and should not be considered to be limiting in any respect.

Figure 2:
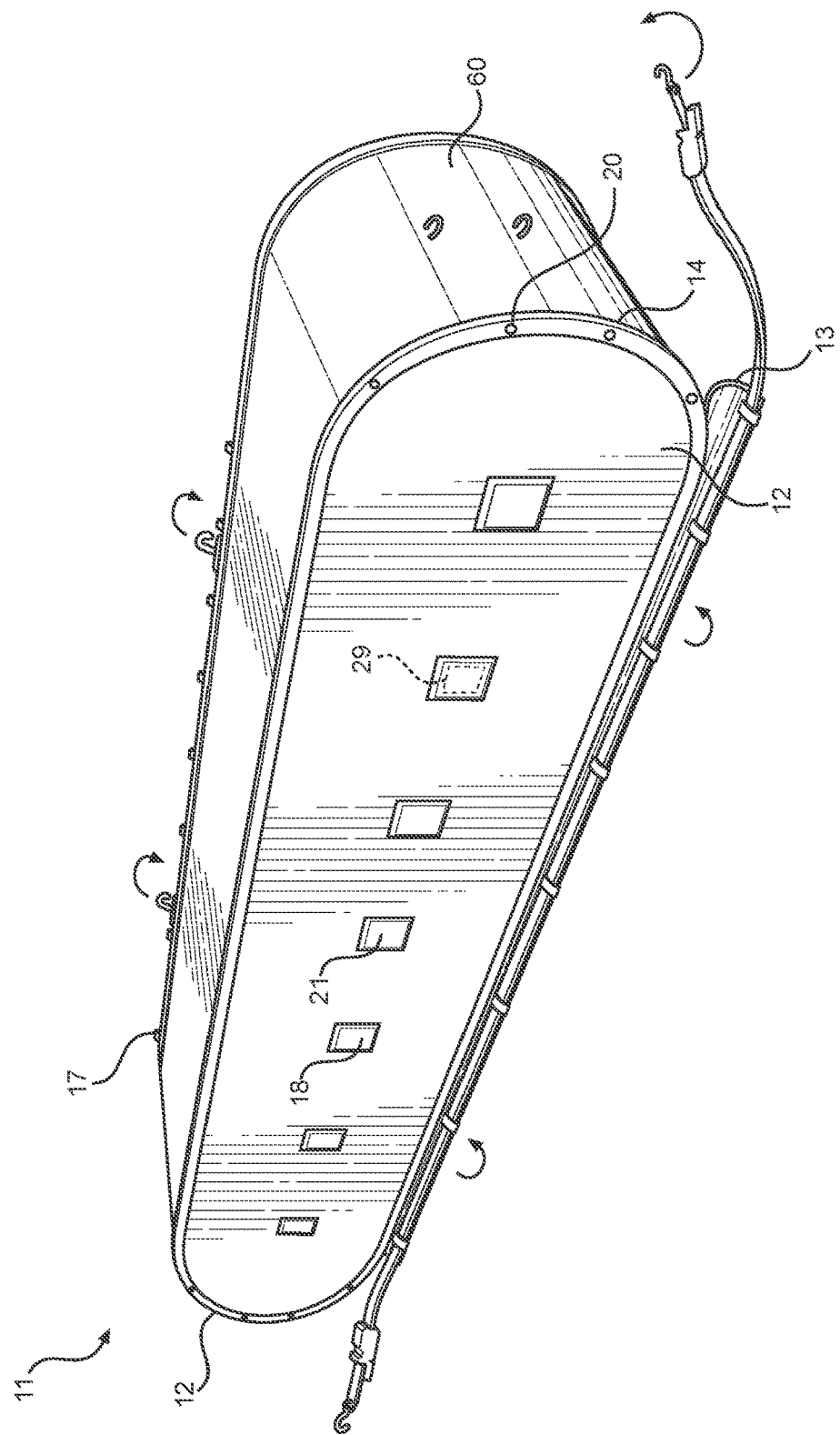
FIG. 2 shows a perspective view of the continuous track covering device disposed on a continuous track of an item of heavy equipment.

Referring now to FIGS. 1 and 2, there is shown a perspective view of the continuous track covering device and a perspective view of the continuous track covering device disposed on a track of an item of heavy equipment, respectively. The continuous track covering device 11 comprises an elongated cover 12 having a front surface 22 and a rear surface, wherein the cover 12 includes a first panel 13, a second panel 14, and a third panel 15. The first panel 13 is pivotally secured to the second panel 14 and the second panel 14 is pivotally secured to the third panel 15 such that the panels of the elongated cover 12 are arranged side by side. Thus, the first panel 13 is attached to a first side of the second panel 14 and the third panel 15 is attached to the opposite side of the second panel 14 such that the elongated cover 12 can lay flat or wrap around a track of a continuous track vehicle in a U-shaped configuration.

The rear surface cover 12 is adapted to be positioned against a stationary continuous track 60 of a continuous track vehicle. The first panel 13 is adapted to be positioned on the bottom of the continuous track 60, the second panel 14 is adapted to be positioned on an exterior side of the track 60, and the third panel 15 can be positioned on the top portion of the track 60. In this way, the exposed portions of the stationary track 60 can be covered during transportation of the continuous track vehicle in order to prevent dirt and debris on the track 60 from falling on to the roadway. Preferably, the first and third panels 13, 15 are substantially rectangular in configuration, wherein the second panel 14 comprises a rectangular shape with rounded ends so as to correspond to the shape of the side of a continuous track 60. However, in other embodiments, the panels 13, 14, 15 may comprise any suitable configuration that corresponds to the shape of a continuous track 60. Preferably, the elongated cover 12 is composed of a flexible material that enables the first and third panels 13, 15 to wrap around the track.

The first panel 13 comprises one or more loop fasteners 17 adapted to receive a first strap 23 therethrough. Preferably, the loop fasteners 17 are disposed on a first side of the first panel 13, wherein the opposing side is connected to the second panel 14. In some embodiments, the continuous track covering device 11 comprises a first strap 23 and a second strap 24, wherein each strap 23, 24 is disposed through loop fasteners 17. Preferably, the first strap 23 is elongated with a ratchet in order to tension the strap, preferably composed of Nylon or other like material. However, in other embodiments, the strap 23 can comprise an elastic that is able to stretch. The first strap 23 comprises a first end 25 and a second end 26, wherein the ends 25, 26 each comprise a hook or clip that is removably secured to the third panel 15 in order to secure the elongated cover 12 to the continuous track 60.

The second panel 14 comprises one or more pockets 18 adapted to receive a magnet 29 therein in order to secure the second panel 14 to the side of the continuous track. In the illustrated embodiment, each pocket 18 comprises a front wall 21 and a rear wall, wherein the rear wall is the front surface 22 of the second panel 14. A magnet 29 is positioned in the pocket 18. In some embodiments, the pocket 18 comprises an open upper end that enables the magnet 29 to be removable from the pocket 18. The pockets 18 are aligned horizontally in order to removably secure the length of the second panel 14 to the continuous track 60.

The third panel 15 comprises a first end 31 and a second end 32, wherein each end 31, 32 includes one or more fasteners 19 thereon for receiving the ends 25, 26 of the first strap 23. Any suitable fastener 19 may be used, such as D-rings 19. In the illustrated embodiment, a pair of D-rings are vertically aligned and attached to each end 31, 32 of the third panel 15. However, in other embodiments, one D-ring 19 may be attached thereto.

In some embodiments, the elongated cover 12 further comprises a plurality of apertures 20 disposed on the periphery each panel 13, 14, 15. An aperture 20 on one panel 13 is adapted to align with another aperture on an adjacent panel 14. The aligned apertures 20 are adapted to receive a fastener, such as a clip or tie, therethrough in order to further secure the cover 12 to the continuous track 60.

Figure 3:
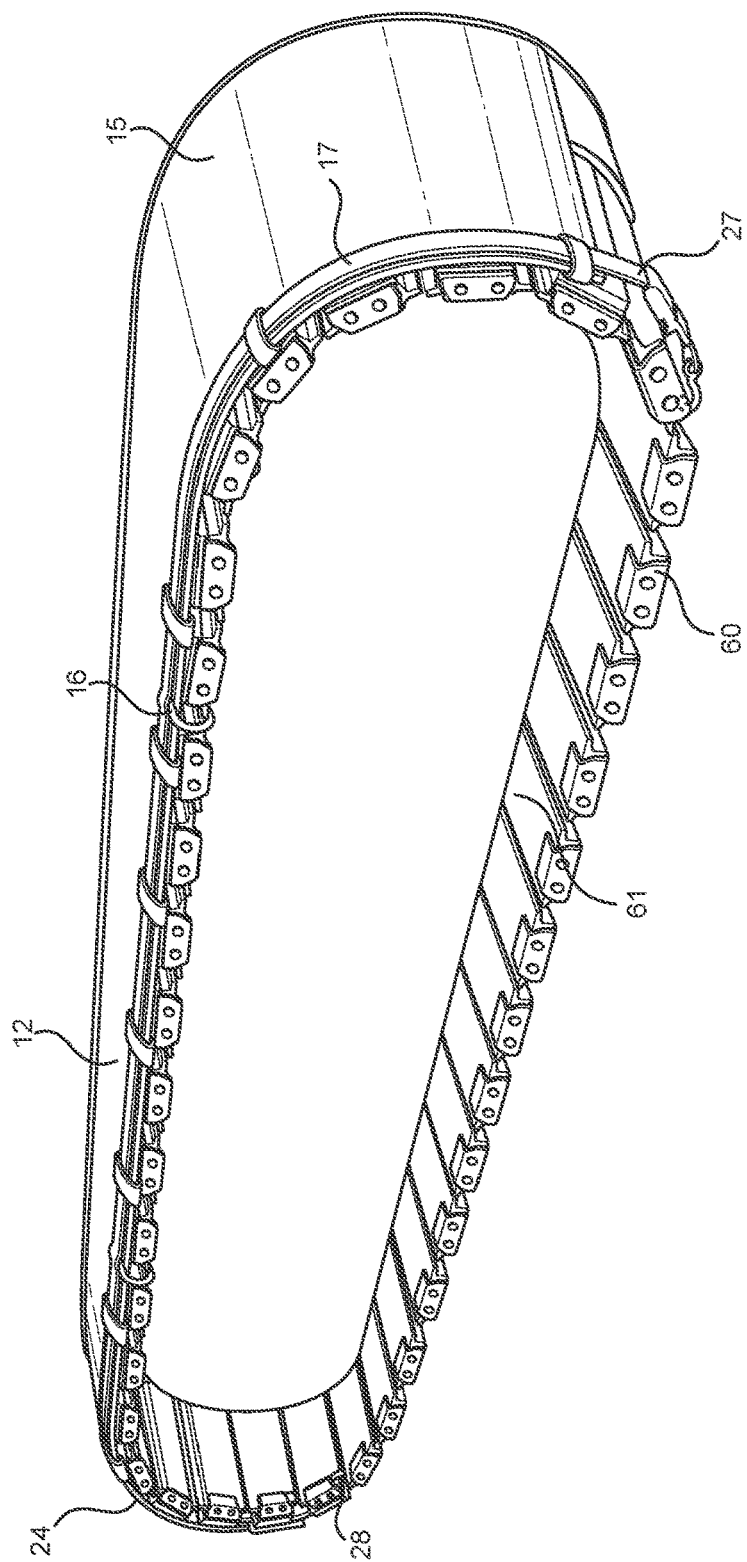
FIG. 3 shows a side perspective view of the continuous track covering device disposed on an interior side of a continuous track.

Referring now to FIG. 3, there is shown a side perspective view of the continuous track covering device disposed on an interior side of a continuous track. The third panel 15 further comprises one or more loop fasteners 17 for receiving a second strap 24 therethrough in order to further secure the cover 12 to the continuous track 60. Preferably, the loop fasteners 17 are disposed on a second side thereof, wherein the opposing side is connected to the second panel 14. In some embodiments, the continuous track covering device 11 comprises a second strap 24 disposed through the loop fasteners 17 of the third panel 15. The second strap 24 includes a first end 27 and second end 28, wherein the ends 27, 28 each comprise a hook or clip adapted to be removably attached to the continuous track 60, between the treads thereof. The third panel 15 further comprises one or more side hooks 16 extending outwards therefrom and adapted to directly removably attach to the interior side 61 of the continuous track 60 in order to provide further securement of the cover 12 thereto.

Figure 4:
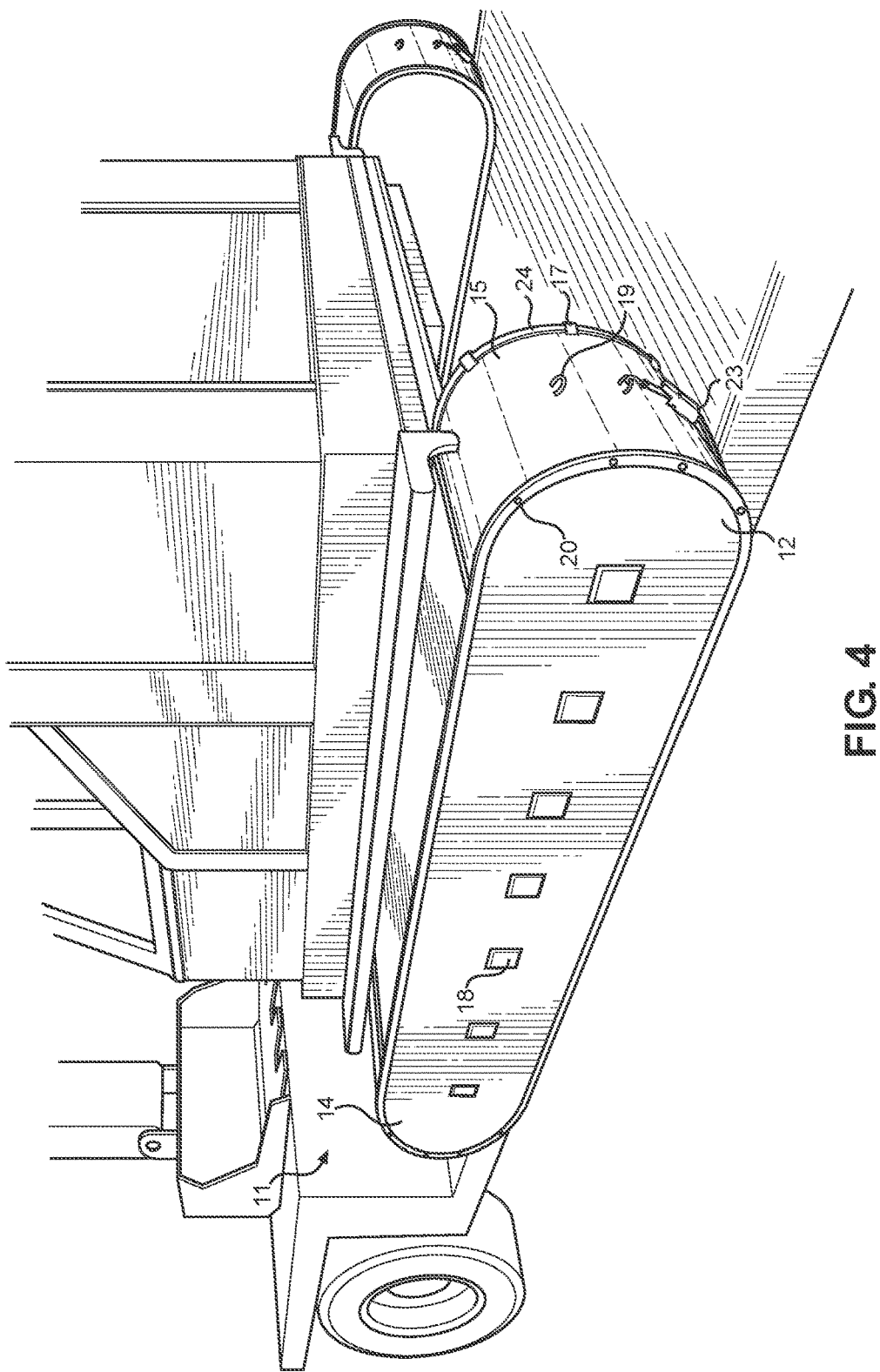
FIG. 4 shows a perspective view of the continuous track covering device in use.

Referring now to FIG. 4, there is shown a perspective view of the continuous track covering device in use. In operation, the first panel of the elongated panel 12 is positioned beneath the stationary continuous track so that the second panel 14 extends perpendicularly upward therefrom. The second panel 14 is positioned against the exterior side of the track, wherein the third panel 15 extends perpendicularly therefrom and is parallel to the first panel. A first strap 23 is positioned through the loop fasteners 17 of the first panel. The first end of the first strap 23 is removably secured to the D-rings 19 disposed on the first end of the third panel 15 and the second end of the first strap 23 is removably secured to the D-rings 19 disposed on the second end of the third panel 15. A second strap 24 is positioned through the loop fasteners 17 of the third panel 15, wherein the ends of the second strap 24 are removably secured to the continuous track. The side hooks are removably secured to the continuous track and a magnet is placed within each pocket 18 disposed on the second panel 14. A tie can be positioned through a pair of aligned apertures 20 in order to maintain the position of the cover 12 on the continuous track. The cover 12 is wrapped around the exposed area of the continuous track in order to prevent dirt and debris build up that develops between the moving components of the continuous track from leaving therefrom and falling on to the roadway or striking other vehicles on the road.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A continuous track covering device, comprising:
   a cover composed of a flexible material having a first panel, a second panel, and a third panel, wherein said first panel is secured to said second panel and said second panel is secured to said third panel;
   wherein said first panel, said second panel, and said third panel each include a front surface and a rear surface, such that said rear surface is adapted to rest against a continuous track of a continuous track vehicle;
   a plurality of pockets disposed on said front surface of said second panel in a linear arrangement, each pocket of said plurality of pockets including an open upper end;
   a plurality of magnets, wherein each magnet of said plurality of magnets is removably disposed within one pocket of said plurality of pockets, wherein said plurality of magnets are configured to secure said rear surface of said second panel against an outer side of said continuous track;
   wherein said first panel comprises one or more loop fasteners disposed on a side thereof and adapted to receive a strap therethrough for removably securing said first panel, said second panel, and said third panel to said continuous track in a U-shaped configuration.

2. The continuous track covering device of claim 1, wherein said second panel comprises a first side opposing a second side, wherein said first panel is secured to said first side of said second panel and said third panel is secured to said second side of said second panel, such that said first panel, said second panel, and said third panel are arranged side by side.

3. The continuous track covering device of claim 1, wherein said third panel comprises one or more loop fasteners on a side thereof and adapted to receive a strap therethrough for removably securing said third panel to said continuous track.

4. The continuous track covering device of claim 3, further comprising a strap having a first end and a second end, wherein said strap is disposed through said one or more loop fasteners of said third panel and said first end and said second end are removably secured to said continuous track.

5. The continuous track covering device of claim 1, wherein said third panel comprises a first end and a second end each having one or more D-rings thereon for removably securing a strap thereto in order to secure said cover over said continuous track.

6. The continuous track covering device of claim 1, further comprising one or more side hooks disposed on said third panel and adapted to removably secure said cover to an interior side of said continuous track.

7. The continuous track covering device of claim 1, further comprising a plurality of apertures disposed on a periphery of said cover, wherein a first aperture is disposed on a panel and a second aperture is disposed on an adjacent panel such that said first and second aperture are adapted to align with one another in order to receive a tie therethrough.

8. The continuous track covering device of claim 1, further comprising a strap having a first end and a second end, wherein said strap is disposed through said one or more loop fasteners of said first panel and said first end and said second end of said strap are removably secured to said third panel.

* * * * *